Figure 3A:
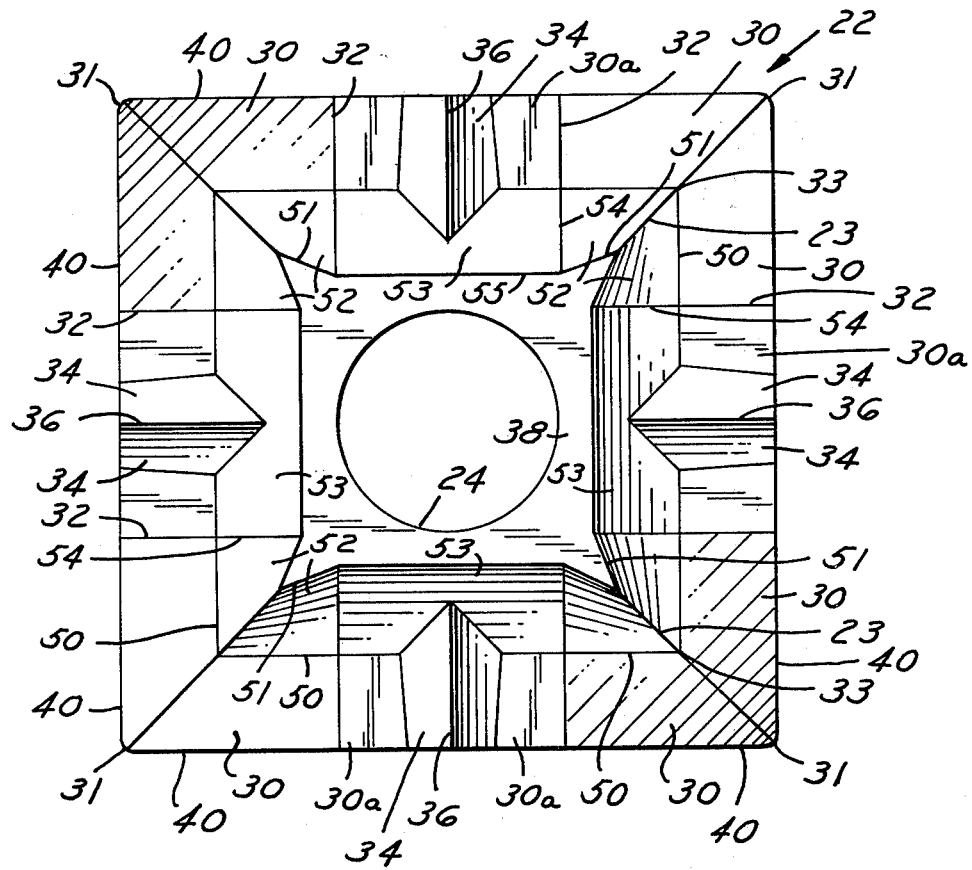

United States Patent [19]

Arnold et al.

[11] 4,189,265
[45] Feb. 19, 1980

[54] POSITIVE CHIP CONTROL INSERT

[75] Inventors: Leonard R. Arnold, Highland Park, Ill.; Robert W. Berry, Jr., Hazel Park, Mich.

[73] Assignee: Fansteel Inc., North Chicago, Ill.

[21] Appl. No.: 942,549

[22] Filed: Sep. 15, 1978

[51] Int. Cl.² .............................................. B26D 1/12
[52] U.S. Cl. .................................................... 407/114
[58] Field of Search ................................ 407/114, 115

[56] References Cited

U.S. PATENT DOCUMENTS

| | | | |
|---|---|---|---|
| 3,487,515 | 1/1970 | Contrucci | 407/114 |
| 3,751,782 | 8/1973 | Fruish | 407/114 |
| 3,786,540 | 1/1974 | Lundgren | 407/114 |
| 4,056,872 | 11/1977 | Seidel | 407/114 |

Primary Examiner—Harrison L. Hinson
Attorney, Agent, or Firm—Barnes, Kisselle, Raisch & Choate

[57] ABSTRACT

An indexable, insert for single-point and multiple-point negative rake holding devices which convert the cutting point to a positive cutting geometry. The insert has straight descending and widening V-shaped grooves from each corner along the adjacent sides, each groove modulating into a low angle straight section which rises abruptly into a radial cross-ridge at the midpoint of the groove, the cross-ridge rising to a crest line below the plane of the resulting island created by the grooves around the insert.

6 Claims, 17 Drawing Figures

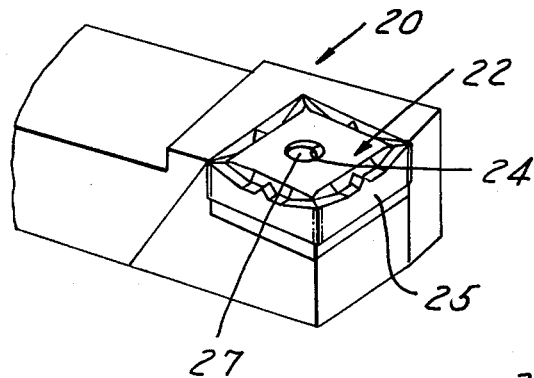
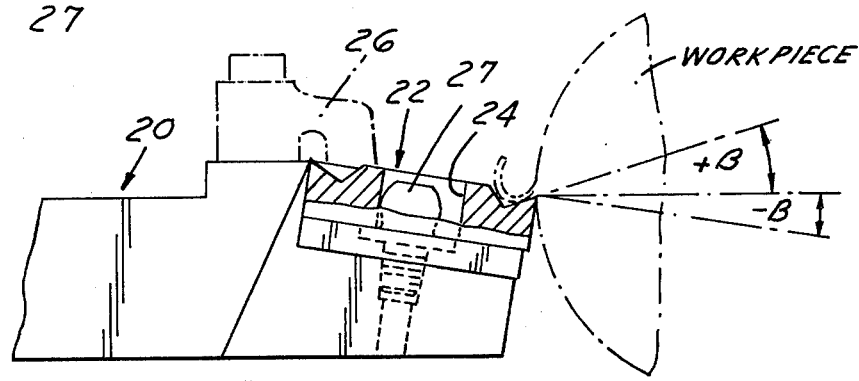
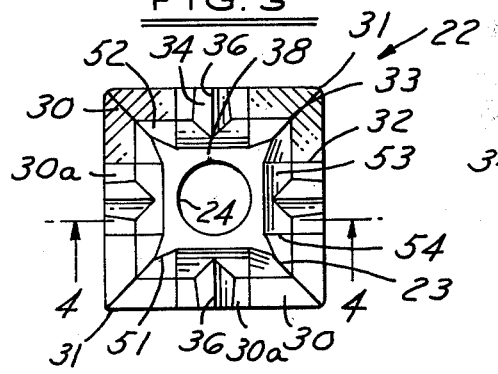
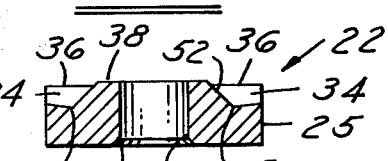
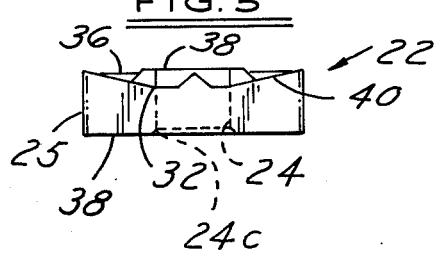
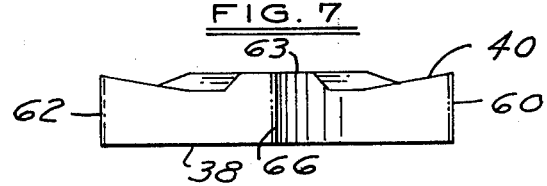

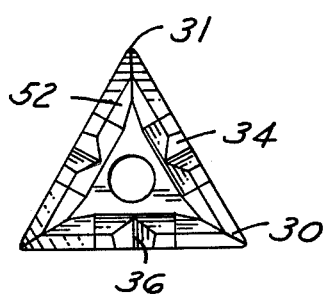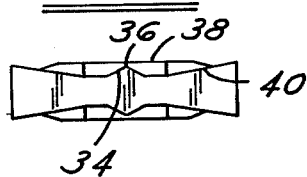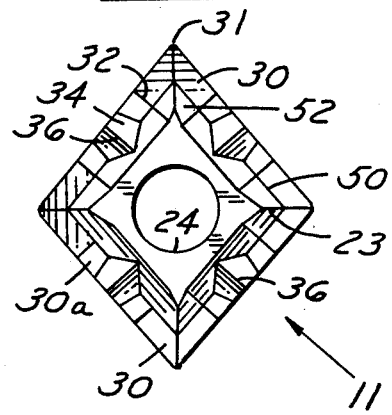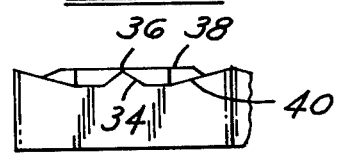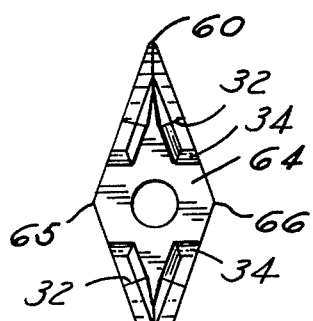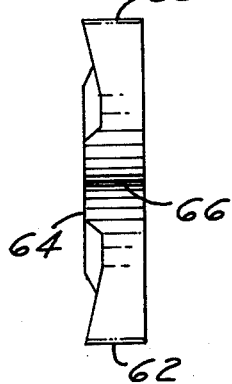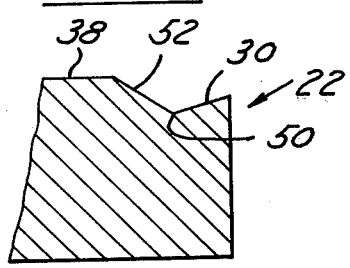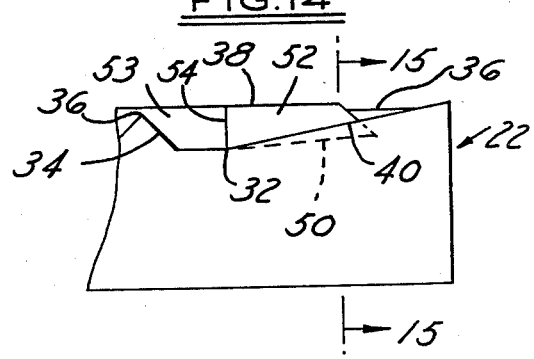

POSITIVE CHIP CONTROL INSERT

FIELD OF THE INVENTION

This invention relates to cutting inserts for single-point and multiple-point negative rake holding devices, and more particularly to cutting inserts of the indexable type for converting negative rake holding devices to provide positive rake cutting.

BACKGROUND OF THE INVENTION

The general type of insert involved here is illustrated in the United States patent to Hill, Nos. 3,097,417, which issued July 16, 1963. More recent patents include U.S. patents to Jones, 3,399,442, and to Seidel, 4,056,872, which show continuous grooves around the insert, and a U.S. patent to Contrucci, 3,487,515, which shows a flat radial extension of the central island of the insert to increase stability of the insert.

With the advent of the processing die method of shaping inserts, it becomes possible to incorporate configurations which could not be conveniently ground into an insert.

The present invention is directed to an insert design which is an improvement over previous designs and which lends itself to manufacture by the die-pressing methods currently used today for producing hard, wear and abrasion-resistant materials such as cemented hard metal carbides.

In state-of-the-art descending curves, cutting edge inserts with a continuous chip control groove, particularly with inserts having high rake angles, the thickness of the insert is substantially reduced and thinned along the center of the insert cutting edges, thereby weakening the insert at the center point. Another problem with continuous groove inserts lies in the press forming. Because the edge of the insert is narrowed centrally, there is a tendency for the insert to bulge out at the side edges after pressing and sintering. This results in an insert which is not a true square, triangle, or other polygon. With the present invention, the groove shape and center ridge to be described substantially reduces the need to compensate or correct for the center edge squeeze-out and thus provides a more accurate finished product.

The insert design of this invention utilizes straight line, V-shaped grooves extending inwardly and downwardly from and for a distance along the cutting edges and from each cutting corner. This groove distance totals about one-third of the side length of the insert for triangular, square, and large angle parallelogram insert styles; and is about one-half of the insert side length for small angle parallelogram insert styles. The outer faces of the grooves provide a positive rake angle when the insert is mounted in a negative rake holder. Then the grooves have a short level-off section, with a constant cross section. Near the center of the insert side length, the groove rises abruptly from the short level-off section to a crest or plateau of a reinforcing cross-ridge or midrise extending radially from the top and bottom faces or island.

This construction provides inserts of improved strength.

In state-of-the-art inserts employing curved line grooves, the rake angles vary continuously with distance from the cutting corner because of the groove curvature.

By contrast, inserts of this invention achieve constant rake angles over a broad range of depths of cuts because of the straight line groove design. The inserts provide good chip control, especially on light to medium depth cuts of up to about one-third of the cutting edge.

Furthermore, the rake angles can be selected to cover a broad range of the order of 5° to 20° positive rake, or greater if desired, when the inserts are placed in a negative rake holder.

Thus, the improved design is intended to have a wider range of machining capabilities.

Also, it is intended to provide both a greater area of support in a holding device and a stronger insert, thereby minimizing tool breakage.

Other objects and features of the invention will be apparent in the following description and claims in which the invention is set forth in a manner to enable those skilled in the art to practice the invention all in connection with the best modes presently contemplated by the inventors.

DRAWINGS accompany the disclosure and the various views thereof may be briefly described as:

FIG. 1, a view of a negative rake tool holder with a positive rake conversion unit therein.

FIG. 2, a view of a tool holder, partially in section, showing the relation of the work.

FIG. 3, a top view of a square insert.

FIG. 3A, an enlarged plan view of the insert of FIG. 3.

FIG. 4, a sectional view on line 4—4 of FIG. 3.

FIG. 5, a side view of the square insert.

FIG. 6, a top view of a parallelogram insert.

FIG. 7, a side view of the insert of FIG. 6.

FIG. 8, a top view of a triangular insert.

FIG. 9, a side view of the triangular insert.

FIG. 10, a top view of a high angle parallelogram insert.

FIG. 11, an end view of the high angle parallelogram of FIG. 10 taken at arrow 11 of FIG. 10.

FIG. 12, a top view of a low angle parallelogram insert.

FIG. 13, a side view of the low angle parallelogram of FIG. 12.

FIG. 14, an enlarged side view of a portion of a square insert.

FIG. 15, a partial section on line 15—15 of FIG. 14.

Figure 16:
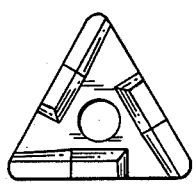

FIG. 16, a top view of an insert showing the groove configuration along one edge only from a particular corner.

REFERRING TO THE DRAWINGS

A tool holder 20 is illustrated in FIGS. 1 and 2. This can be a tool holder with built-in negative rake angles of, for example, 5° with either a pin type retainer for an insert 22 having a central hole 24 with a pin 27, or a top clamp 26 retainer as shown, for example, in dotted lines, or a combination of both means for retention. In FIG. 2, the tool holder and insert are shown in relationship to a workpiece.

The example of a square insert of FIGS. 1 and 2 is shown in greater detail in FIGS. 3, 3A, 4 and 5. The embodiment of these figures has a cutting configuration on one face only, but it can be applied to both faces as illustrated in the triangular insert of FIGS. 8 and 9. In FIG. 3 is shown a top view of the insert 22 constructed in accordance with the present invention. This is shown enlarged in FIG. 3A. A polygonal shape has top and bottom parallel surfaces 38 connected in this instance by four sides 25, each perpendicular to the top and bottom faces 38. The central hole 24 is provided when the insert is to be used in a pin-type holder, and generally will have a chamfer 24C at the lower periphery. From each cutting corner of the polygon, a deepening and widening groove is cut into the face of the insert, each groove having an outer face in the form of a flat plane 30 descending from a cutting edge and progressing downwardly from the corner to a junction line 32 where the outer face levels off and terminates at a cross-ridge formed by walls 34 rising at an angle to the horizontal and intersecting at a crest line 36 which is below the plane of the central island 38 as shown in FIGS. 4 and 5.

With reference to FIG. 2, the rake angle of the holder is shown as −B. The effective rake angle with the conversion insert 22 is shown as +B. It is well known, of course, that there must be side clearance or relief for the insert as well as end clearance. The present insert design leads itself to selection and utilization of a wide choice of back rake conversion angles.

The angle of descent of the outer cutting or side edge 40 can be selected and can vary over a wide range from about 5° to 20°, or even greater. The outer face 30 of the groove also descends downwardly from the side edge 40 toward the center of the insert. This descent angle of the outer face also can be selected and can vary over a wide range from about 5° to 20°.

In one preferred embodiment, the angles of descent are 7° for both the outer edge 40 and the outer face 30. This results in a generated positive rake angle of about 10° to 12° from cutting corner 31 downward to junction 33 formed by the intersecting grooves at the corner. When the insert is installed in a tool holder having 5° negative rake angles, the insert provides 5° positive rake.

In another preferred embodiment, the angles of descent are 12° for both edge 40 and outer face 30, resulting in a generated positive rake angle of about 19° to 21° from cutting corner 31 to junction 33, and when it is installed in a tool holder having 5° negative rake, it provides 15° positive rake.

The inner face 52 of the groove is also a flat plane rising from a keel line or junction 50 with outer face 30 at an angle in the range of about 30° to 60° with respect to the flat faces or island 38. This specific angle of rise varies with the insert style and size to achieve optimal chip breaking characteristics. This angle is in the range of 40° to 60° for ⅜ to ½" I.C. (inscribed circle) inserts, and 30° to 45° for ⅝" I.C. and larger inserts. This plane also diverges from the corner and side edge and thus the inner face creates a corner crest 23 extending downward from center island 38 to outer face 30, which crest bisects the insert corner 31. This feature also results in a junction 51 with island 38 and ascending wall 52 which progressively diverges from edge 25 as distance from corner 31 is increased.

The outer face 30 of the groove which descends in two directions terminates at junction line 32. This junction line is positioned at about one-third of the length of edge 25 in polygonal insert styles such as: squares, FIGS. 1, 3, 4, 5, 14 and 15; triangles, FIGS. 8 and 9; and wide angle parallelograms, FIGS. 10 and 11. The wide angle parallelogram styles often are referred to in the trade by designations such as "80° diamond", which specifies the acute angles. In insert styles such as low angle parallelograms, the junction line 32 is positioned at about one-half of the length of the edge 25. These latter insert styles often are referred to in the trade by designations such as "35° diamond" and "55° diamond", which specifies the particular acute angles illustrated in FIGS. 6, 7, 12 and 13.

Beyond the junction line 32, the outer face of the groove continues to slope downward from edge 25 by the same angle as for outer face 30, but side edge 40 no longer descends, and is now parallel to the top and bottom face 38 in this single slope or level-off section 30a of the outer face of the groove.

The level-off section 30a terminates at a cross-ridge or midrise 34, which rises at an angle to the horizontal and terminates at crest line 36.

In the same manner as for outer face 30, the inner face 52 reaches a junction line 54, which intersects coextensively with junction line 32. Beyond junction 54, the continuation 53 of the inner face parallels the insert edge until it reaches and intersects with ascending wall 34 of the cross-ridge centrally of the side.

In polygonal insert shapes such as squares, triangles, and wide angle parallelograms, crest line 36 occurs about 0.005-inch to 0.020-inch, typically about 0.015-inch, below the plane of the central island 38 as shown in FIGS. 4 and 5. The angle formed at crest 36 by the intersecting ascending and descending walls 34 ranges from about 100° to 130°, the specific value depending on the insert style and size.

In low angle polygonal insert styles, which have only two cutting corners 60 and 62, as shown in FIGS. 6, 7, 12 and 13, the ascending wall 34 continues to the level of face 38 to provide a continuous horizontal plateau 63 in FIG. 6 or plateau 64 in FIG. 12 transversely connecting the obtuse non-cutting corners 65 and 66 to provide support, stability, and strength to the insert. The specific shape or configuration of the plateau 63 or 64 can vary as shown in FIGS. 6 and 12 depending on the specific insert shape and size.

In square, triangular and high angle parallelogram insert styles, as discussed, the cross-ridge intersects radially with inner face 53, and terminates at crest 36, which is below the level of island 38. Thus, in these insert styles, inner face 53 continues beyond crest 36 until it intersects with a second junction 54 in proceeding toward the next adjacent cutting corner as shown in FIG. 3A.

In low angle parallelogram type inserts, inner face 53 terminates when it intersects with ascending wall 34 of plateau 63 in FIG. 6 or plateau 64 in FIG. 12.

In the insert design of this invention, as described, the groove formed by outer face 30 and inner face 52 is V-shaped and progressively diverges or becomes wider because of the progressive downslope of keel line 50 and the resulting progressively increasing height of the ascending wall of inner face 52 from the keel line upward to the island 38. Beyond the junction lines 32 and 54, the V-groove is constant in crosssection until, or beyond, its intersection with the cross-ridge. This groove construction results in an improvement in chip control when machining over a wide range of cutting depths and feed rates.

In FIG. 16, an insert is illustrated having a single groove extending from each corner. This insert will have to be for a right hand or left hand cut and would be particularly useful for a very light cut where the inner face extends uninterruptedly from the corner to provide improved chip control.

We claim:

1. A positive rake cutting insert of hard material adapted for being mounted in a negative rake holder, said insert comprising a polygonal body having opposed top and bottom faces in parallel planes and a polygonal peripheral surface formed of side edges perpendicular to said planes and joining conjunctively at corners of said polygon, at least one of said faces having a groove recess descending along an edge from a corner of said polygon having an outer region formed by a first outer plane descending in a compound angle inwardly toward the axis of said polygon at a downward angle inclined to said axis and progressing downwardly from said corner along a polygonal side toward the central portion of said side, and by a second outer plane descending from a line parallel to said faces at an angle to said axis, said groove having an inner region formed by a plane angled upwardly from the bottom of said groove away from a respective peripheral side and angled inwardly from a corner toward the axis of said insert, said inner and outer regions joining conjunctively with the base of a ridge extending outwardly from the inner region to a polygonal side and formed by rising planes terminating adjacent the plane of said grooved face.

2. A cutting insert as in claim 1 in which said groove diverges along cutting edges on each conjunctive side of a corner of said insert, each to terminate at a said ridge.

3. A positive rake cutting insert as defined in claim 1, in which the inner region terminates in a portion spaced from the corner in a flat plane angling upwardly from the keel of the groove, and intersecting the face in a line parallel to the side edge.

4. A positive rake cutting insert as defined in claim 1, in which the grooves diverge to each side adjacent each corner of the polygon and the ridge is formed by planes converging toward each other and meeting at a crest adjacent the plane of said face.

5. A positive rake cutting insert of hard material adapted for being mounted in a negative rake holder, said insert comprising a polygonal body having opposed top and bottom faces in parallel planes and a polygonal peripheral surface formed of side edges perpendicular to said planes and joining conjunctively at corners of said polygon, at least one of said faces having a groove recess descending along each conjunctive edge from a corner of said polygon, each groove having an outer region formed by a first outer plane descending in a compound angle inwardly toward the axis of said polygon at a downward angle inclined to said axis and progressing from said corner along a side toward the central portion of said side, and by a second outer plane descending from a line parallel to said faces at an angle to said axis, said groove having an inner region formed by a plane angled upwardly from the bottom of said groove away from said side and angled inwardly toward the axis of said insert to provide a widening groove, said inner and outer regions joining conjunctively at the central portion of said sides with the base of a rising plane extending upwardly to the face of the insert.

6. A positive rake cutting insert as defined in claim 5, in which the inner region terminates in a portion spaced from the corner in a flat plane angling upwardly from the keel of the groove, and intersecting the face in a line parallel to the side edge.